(12) United States Patent
Wu et al.

(10) Patent No.: US 7,369,549 B2
(45) Date of Patent: May 6, 2008

(54) ADAPTIVE RATE PRIORITIZING

(75) Inventors: Qiang Wu, San Diego, CA (US); Peter J. Black, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 906 days.

(21) Appl. No.: 10/397,989

(22) Filed: Mar. 25, 2003

(65) Prior Publication Data

US 2004/0190507 A1   Sep. 30, 2004

(51) Int. Cl.
  H04L 12/28    (2006.01)
  H04L 12/56    (2006.01)
  H04Q 7/24     (2006.01)
(52) U.S. Cl. .................. 370/389; 370/338; 370/395; 455/450
(58) Field of Classification Search ........ 370/229–252, 370/328–335, 347–352, 436–465; 455/452–522
See application file for complete search history.

(56) References Cited

U.S. PATENT DOCUMENTS

| | | | |
|---|---|---|---|
| 5,699,365 | A | 12/1997 | Klayman et al. |
| 5,857,147 | A * | 1/1999 | Gardner et al. .......... 455/67.11 |
| 6,426,971 | B1 * | 7/2002 | Wu et al. .................... 375/227 |
| 6,807,426 | B2 * | 10/2004 | Pankaj ........................ 455/453 |
| 6,832,095 | B2 * | 12/2004 | Haim .......................... 455/522 |
| 6,868,278 | B2 * | 3/2005 | Haim .......................... 455/522 |
| 6,898,198 | B1 * | 5/2005 | Ryan et al. ................. 370/338 |
| 7,050,405 | B2 * | 5/2006 | Attar et al. ................. 370/282 |
| 7,072,661 | B2 * | 7/2006 | Vitebsky ................... 455/452.1 |
| 7,116,981 | B2 * | 10/2006 | Jeon et al. ................... 455/450 |
| 2001/0040877 | A1 * | 11/2001 | Love et al. ................. 370/329 |
| 2001/0053141 | A1 | 12/2001 | Periyalwar et al. |
| 2004/0151122 | A1 * | 8/2004 | Lau et al. .................... 370/252 |
| 2004/0176033 | A1 * | 9/2004 | Tamaki et al. ................ 455/59 |
| 2004/0258070 | A1 * | 12/2004 | Arima ...................... 370/395.4 |

FOREIGN PATENT DOCUMENTS

| | | |
|---|---|---|
| EP | 1 178 623 A2 | 2/2002 |
| WO | 01/99384 A2 | 12/2001 |

OTHER PUBLICATIONS

International Search Report ISA EPO PCT/US2004/008949 Oct. 8, 2004.

* cited by examiner

Primary Examiner—Man U. Phan
(74) Attorney, Agent, or Firm—Sandra L. Godsey; Eric Ho; Thomas Rouse

(57) ABSTRACT

Systems and techniques are disclosed relating to communications. The systems and techniques involve measuring a quality of a transmission from a remote location, identifying a data rate as a function of the measured quality, the identified data rate being capable of supporting a plurality of packet lengths, selecting one of the packet lengths as a function of a parameter of the measured quality, and providing feedback to the remote location, the feedback relating to the data rate and the selected one of the packet lengths. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or the meaning of the claims.

20 Claims, 4 Drawing Sheets

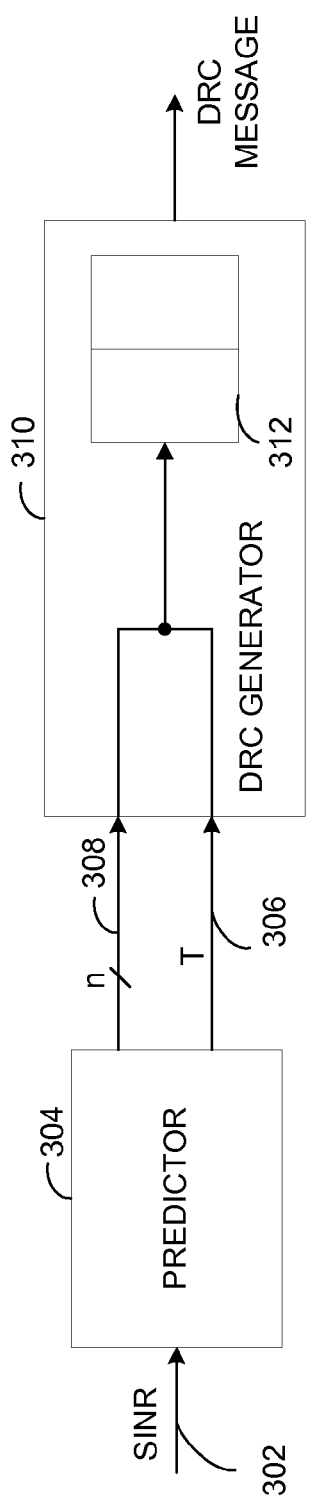
FIG. 3
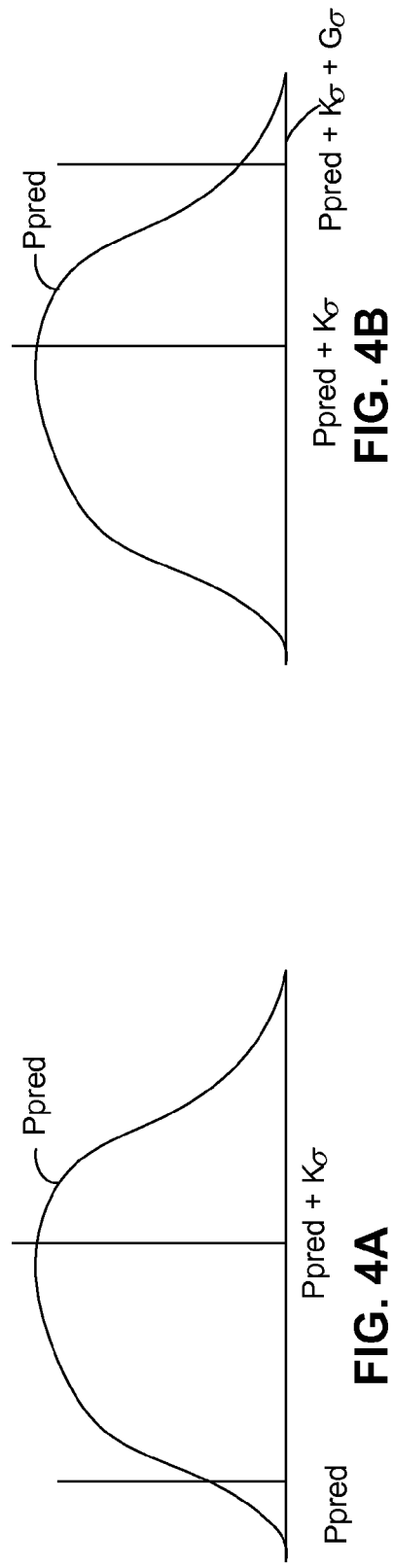
FIG. 4A
FIG. 4B

ADAPTIVE RATE PRIORITIZING

BACKGROUND

1. Field

The present invention relates generally to communications, and more specifically, to adaptive rate prioritizing in a variable rate communications system.

2. Background

Wireless communication systems are designed to allow multiple users to share a common communications medium. One such wireless communications system is a code division multiple access (CDMA) system. The CDMA communications system is a modulation and multiple access scheme based on spread-spectrum communications. In a CDMA communications system, a large number of signals share the same frequency spectrum and, as a result, provide an increase in user capacity. This is achieved by transmitting each signal with a different code that modulates a carrier, thereby spreading the signal over the entire spectrum. The transmitted signals can be separated in the receiver by a demodulator using a corresponding code to de-spread the desired signal. The undesired signals, whose codes do not match, contribute only to noise.

Originally developed for voice applications, CDMA communication systems today can support high data rate services. In these systems, a variable data rate request scheme may be used to communicate at the maximum data rate that can be supported by the current channel conditions. By way of example, a wireless device may be configured to measure the quality of a signal transmission from a base station, and provide feedback to the base station to control the data rate.

In most high data rate CDMA communication systems today, the data rates available to the-base station are predetermined. Each available data rate may be assigned to at least one rate index which is generally referred to in the art as a data rate control (DRC) index. Associated with each DRC index is a transmission format which includes a packet length for the payload. The packet length is generally defined in terms of time slots. A specific data rate may be assigned to more than one DRC index with different slot formats. In this case, the conventional approach has been to select the long slot format to increase the probability of potential throughput gain (i.e., ARQ early termination gain) that may occur if the wireless device is able to decode the payload before all the time slots have been transmitted. However, consistent preference for the long slot format has the drawback of reducing overall packing efficiency of the payload. Conversely, maximizing packing efficiency by consistently preferring a short slot format reduces the potential for ARQ early termination gain. Accordingly, it would be advantageous to provide a communications system with adaptable preference capability that enables adaptive selection between long and short slot formats for a given data rate without diminishing the ARQ gain.

SUMMARY

In one aspect of the present invention, a method of communications includes measuring a quality of a transmission from a remote location, identifying a data rate as a function of the measured quality, the identified data rate being capable of supporting a plurality of packet lengths, selecting one of the packet lengths as a function of a parameter of the measured quality, and providing feedback to the remote location, the feedback relating to the data rate and the selected one of the packet lengths.

In another aspect of the present invention, a communications apparatus includes a receiver configured to receive a transmission from a remote location, a processor configured to measure a quality of the transmission, identify a data rate as a function of the measured quality, the identified data rate being capable of supporting a plurality of packet lengths, and select one of the packet lengths as a function of a parameter of the measured quality, and a transmitter configured to transmit feedback to the remote location, the feedback relating to the data rate and the selected one of the packet lengths.

In yet another aspect of the present invention, a communications apparatus includes means for measuring a quality of a transmission from a remote location, means for identifying a data rate as a function of the measured quality, the identified data rate being capable of supporting a plurality of packet lengths, means for selecting one of the packet lengths as a function of a parameter of the measured quality, and means for providing feedback to the remote location, the feedback relating to the data rate and the selected one of the packet lengths.

It is understood that other embodiments of the present invention will become readily apparent to those skilled in the art from the following detailed description, wherein it is shown and described only illustrative embodiments of the invention. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein:

FIG. 3 is a functional block diagram of an embodiment of a predictor and a data rate control generator;

FIGS. 4A and 4B are graphical representations of statistical measurements of signal-to-interference and noise ratio prediction values.

DETAILED DESCRIPTION

The detailed description set forth below in connection with the appended drawings is intended as a description of illustrative embodiments of the present invention and is not intended to represent the only embodiments in which the present invention can be practiced. The term "illustrative" used throughout this description means "serving as an example, instance, or illustration," and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention.

In the following detailed description, various adaptive rate prioritizing techniques will be described in the context of a CDMA communications system. While these techniques may be well suited for use in this environment, those skilled in the art will readily appreciate that these techniques are likewise applicable to various other communication environments. Accordingly, any reference to a CDMA communications system is intended only to illustrate various inventive aspects of the present invention, with the understanding that these inventive aspects have a wide range of applications.

Figure 1:
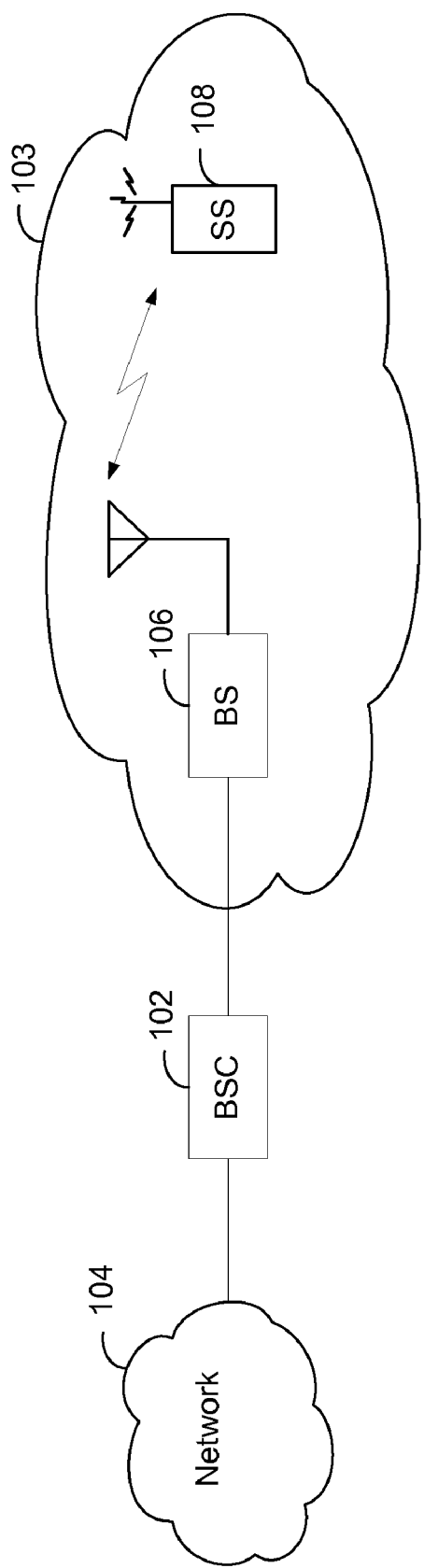
FIG. 1 is a conceptual block diagram of an exemplary CDMA communications system.

FIG. 1 is a conceptual block diagram of an illustrative embodiment of a CDMA communications system employing a variable data rate request scheme. A base station controller (BSC) 102 may be used to interface a wireless network 103 to a communications infrastructure 104. The communications infrastructure 104 may be a packet-based network, such as the Internet, a corporate intranet, or the like. Alternatively, the communications infrastructure 104 may be a circuit-switched network, such as a public switched telephone network (PSTN). The wireless network 103 may be implemented with any number of base stations dispersed throughout a geographic region. The geographic region may be subdivided into smaller regions known as cells with a base station serving each cell. In high traffic applications, the cell may be further divided into sectors with a base station serving each sector. For simplicity, one base station 106 is shown serving an entire sector under control of the BSC 102. A subscriber station 108 operating within the sector may access the communications infrastructure 104, or communicate with other subscriber stations (not shown) through one or more base stations. A subscriber station may be any device that communicates through a wireless channel with a base station including, but not limited to, a cellular telephone, a personal digital assistant, a pager, a modem, a computer, hardware, software, or any combination thereof.

In the illustrative CDMA communications system, the forward link data transmission should occur at or near the maximum data rate that can be supported by the wireless channel. The forward link refers to transmissions from the base station 106 to the subscriber station 108, and a reverse link refers to transmissions from the subscriber station 108 to the base station 106. Initially, the subscriber station 108 may establish communications with the base station 106 using a predetermined access procedure. In this connected state, the subscriber station 108 may receive data and control messages from the base station 106, and is able to transmit data and control messages to the base station 106. The subscriber station 108 may also be configured to measure the quality of the forward link transmission using any technique known in the art. By way of example, a quality metric of the forward link transmission may be measured at the subscriber station by computing the SINR from a forward link pilot signal transmitted from the base station 106. Based on the measured quality of the forward link transmission, the subscriber station 108 may transmit to the base station 106 a DRC message on a DRC channel. The DRC message may include a DRC index indicating the highest possible data rate for efficient forward link transmission.

Figure 2:
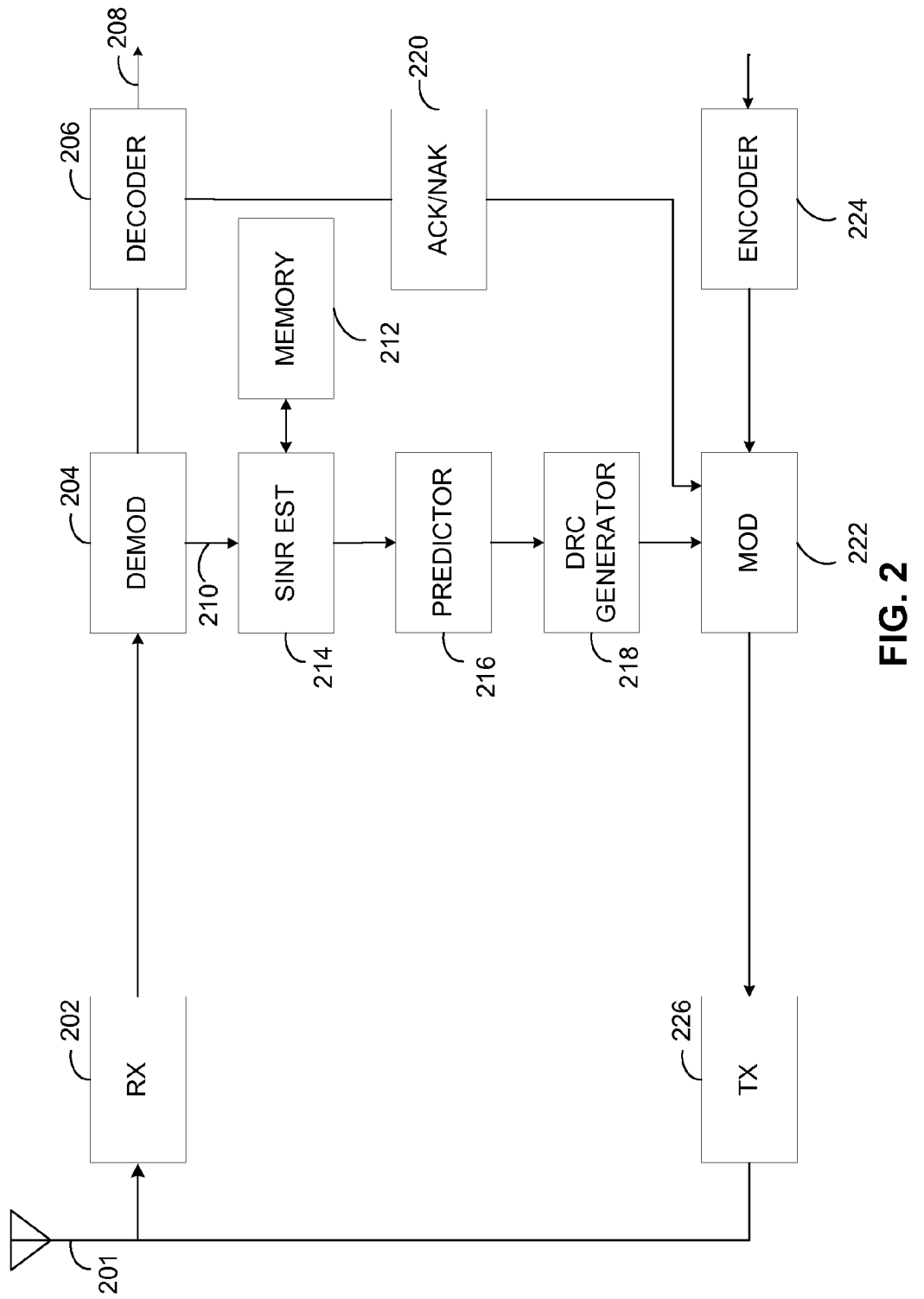
FIG. 2 is a functional block diagram of an embodiment of a subscriber station.

FIG. 2 is a functional block diagram of an illustrative embodiment of a subscriber station. The subscriber station may include an antenna 201 positioned to receive the forward link transmission from the base station. Depending on the DRC message fed back to the base station, the payload may be transmitted on the forward link in a data packet extending over one or more time slots. In a multiple slot transmission, a suitable delay is introduced between the transmission of each time slot of the packet. An acknowledgement (ACK) based protocol may be used at the subscriber station to inform the base station that the payload has been successfully decoded. If this occurs before all the time slots for the data packet have been transmitted, the base station may terminate the transmission resulting in ARQ early termination gain. Alternatively, a negative acknowledgement (NAK) based protocol may be used at the subscriber station to prompt additional time slot transmissions of the packet until the payload is successfully decoded.

The forward link transmission may be coupled from the antenna 201 to a receiver 202 for filtering, amplification, and down-conversion to a baseband signal. The baseband signal may be provided to a demodulator 204 to perform the inverse modulation functions performed at the base station. In a CDMA communications system, this usually entails a signal constellation de-mapping function as well as quadrature demodulation using short pseudo-random noise (PN) codes, de-spreading using Walsh codes, and de-scrambling using a long PN code. In any event, the demodulated signal may be provided to a decoder 206 to extract the payload through a de-interleaving and decoding process. An ACK or NAK message 220 may be generated by the decoder 206 to indicate whether the payload has been successfully decoded.

Since the forward link pilot signal is known, a priori, a quality metric measurement, such as, for example, of the SINR may be taken from the pilot signal by means well known in the art. The forward link pilot is typically not encoded, and therefore, may be coupled directly from the demodulator 204 to a SINR estimator 214.

In one embodiment, a quality metric prediction value can be determined, such as, for example, by using the measured SINR and historical SINR measurements computed by the SINR estimator 214. A predictor 216 can then forecast the average SINR for the following forward link transmission by computing a SINR prediction value. The SINR prediction value may be used to select an appropriate DRC index with the highest data rate that can be supported by the forward link. In cases where the available data rates may be capable of supporting multiple packet lengths, the predictor 216 may compute a SINR prediction value for each of the packet lengths. In one embodiment of a CDMA communications system, five packet lengths may be supported including 1, 2, 4, 8 and 16 slot formats, and the predictor 216 may generate a SINR prediction value for each of the five packet lengths.

Utilizing the output of the predictor 216, a DRC generator 218 may then compute or identify an optimum data rate for each of the SINR prediction values, such as through a mapping function. The mapping function may be performed with a look-up table, an algorithm, or by any other means known in the art. An illustrative look-up table for mapping each of the SINR prediction values to a data rate is shown below in Table 1.

TABLE 1

| Rate (bps) | DRC index | Packet Length (slot) | SINR Threshold (dB) |
|---|---|---|---|
| 2.456M | 12 | 1 | 10.3 |
| 1.843M | 11 | 1 | 8.0 |
| 1.228M | 10 | 2 | 4.0 |
| 1.228M | 9 | 1 | 3.9 |
| 921.6K | 8 | 2 | 2.2 |
| 614.4k | 7 | 2 | −0.6 |
| 614.4k | 6 | 1 | −0.5 |
| 307.2k | 5 | 4 | −3.5 |

TABLE 1-continued

| Rate (bps) | DRC index | Packet Length (slot) | SINR Threshold (dB) |
|---|---|---|---|
| 307.2k | 4 | 2 | −3.5 |
| 153.6k | 3 | 4 | −6.5 |
| 76.8k | 2 | 8 | −9.2 |
| 38.4k | 1 | 16 | −11.5 |

Referring to Table 1, the selected data rate for a given SINR prediction value should be the highest data rate among those whose thresholds are lower than the SINR prediction value. By way of example, a SINR prediction value of 3.0 dB for a 2-slot transmission should result in the selection of a 921.6 kbps data rate. If this SINR prediction value yields the highest data rate among the various SINR prediction values, then the corresponding DRC index (i.e., DRC index 8) should be selected. If, on the other hand, the group of SINR prediction values generated by the predictor 216 result in the highest data rate having multiple slot formats, then a selection may be made according to an adaptive rate prioritizing algorithm that will be described in greater detail later. In any event, a DRC message may be formed with the selected DRC index and provided to a modulator 222.

The modulator 222 may be used to perform a signal constellation mapping functions and to spread the various channels with the appropriate Walsh codes for transmission over the reverse link. By way of example, the DRC message from the DRC generator 218 and the ACK message from the decoder 206 may be time division multiplexed and spread with the same Walsh code. Alternatively, the DRC message may be spread with a Walsh code unique to the DRC channel, and the ACK or NAK message may be spread with a different Walsh code. In some implementations, one or both of the DRC message and the ACK/NAK message may be punctured into a data stream from an encoder 224. In any event, once the channel configuration is established through the allocation of Walsh codes, each channel may be summed together, quadrature modulated, and provided to a transmitter 226 for up-conversion, amplification and filtering before transmission over the reverse link via the antenna 201.

FIG. 3 is a functional block diagram of an illustrative predictor and DRC generator, which in combination with the SINR estimator may be collectively utilized to implement an adaptive rate prioritizing algorithm. The adaptive rate prioritizing algorithm may be used to select a packet length for the highest data rate supported by the forward link if the highest data rate supports multiple slot formats. The algorithm may be based on a parameter of the measured quality of the forward link transmission. By way of example, and without limitation, if the quality of the forward link transmission is measured by one or more SINR prediction values, the standard deviation of prediction error may be used to select the optimum packet length. More specifically, if the standard deviation is small, the probability of ARQ early termination gain is negligible and a short packet length may be preferable over a long packet length in order to improve packing efficiency of the payload. On the other hand, if the standard deviation is large, the probability of ARQ early termination gain is high and a long packet length may be preferable over a short packet length in order to take advantage of the potential for ARQ early termination gain. The standard deviation may be adaptive to account for variations in the wireless channel.

The SINR measurement, illustrated at arrow 302 and discussed above with reference to FIG. 2, may be an input received by the predictor 304. The predictor 304 may then compute the SINR prediction and the standard deviation ($\sigma$) of prediction error, which may be produced as outputs at arrows 308 and 306. The second output, indicated at arrow 308, may comprise one or more (n) SINR prediction values. Techniques for computing SINR prediction values are well known in the art. An example of such a technique is disclosed in U.S. Pat. No. 6,426,971, assigned to the assignee of the present invention, the contents of which is incorporated herein by reference as though set forth in full.

The standard deviation 306 and SINR prediction values 308 may be received as inputs to the DRC generator 310. The DRC generator 218 may then employ a mapping function to identify the highest data rate supported for each SINR prediction value 308. The DRC generator 310 may then select a DRC index corresponding to the highest data rate among those supported by the SINR prediction values 308. If the highest data rate is selected for multiple packet lengths, then the DRC generator 310 may select the DRC index as a function of the standard deviation 306. By way of example, if the highest data rate supported by the SINR prediction values is 1.2 Mbps (i.e., 1.228 Mbps), and this data rate can be supported by a packet length having a 1-slot or 2-slot format (i.e., DRC index 9 and 10, respectively), then the standard deviation 306 may be utilized to select between the two. More specifically, if the standard deviation is below a threshold, the 1-slot format may be selected because the probability of ARQ early termination gain is negligible. If, on the other hand, the standard deviation exceeds a threshold, the 2-slot format may be selected because the probability of ARQ early termination gain is high.

In computing the SINR prediction value ($P_{pred}$), a conservative approach should be used to ensure that the SINR predicted value $P_{pred}$ does not exceed the actual or true SINR ($P_{true}$) of the forward link transmission. If the SINR prediction value $P_{pred}$ exceeds the actual or true SINR $P_{true}$, then the selected data rate will be too high under existing channel conditions to meet the minimum quality of service requirements.

As shown in FIG. 4A, $P_{pred}+K\sigma$ is an unbiased prediction with the value of backoff factor K determined based on a distribution of Ptrue values, i.e. to provide a selected probability of having $P_{pred}$ below $P_{true}$. $P_{pred}$ represents the final conservative prediction where such a conservative approach may be obtained by selecting appropriate backoff values. Given a sufficient margin $G\sigma$, we can ensure that most likely $P_{true} \leq P_{pred}+K\sigma+G\sigma$, as shown in FIG. 4B. Once the SINR prediction value for each of the packet lengths is computed, they collectively may be used to select the DRC index with the highest data rate. If the highest data rate is selected for multiple packet lengths, a threshold may be used to select the optimal DRC index. The selection of the DRC index in this case can be best understood with reference to Table 1. However, as those skilled in the art will readily appreciate, the adaptive rate prioritizing algorithm is operable on any combination of data rates and packet lengths, and is not limited to the specific values shown in Table 1.

Referring to Table 1, if the SINR prediction values support a 1.228 mbps data rate with a 1-slot and 2-slot configuration, then a decision between a DRC index of 9 and a DRC index of 10 should be made. This decision may be made by considering the likelihood of ARQ early termination gain based on a threshold $T_1$. If $P_{true}$ is less than $T_1$, ARQ early termination may be considered unlikely. In that case, the algorithm may adopt a preference that favors the short packet length (i.e. 1 slot) to support a 1.228 mbps data rate over the long packet, 2-slot data format. The threshold $T_1$ above which ARQ early termination is considered likely may be empirically measured and defined, such as by laboratory experimentation and simulations.

Based on the above example, the algorithm may favor a short packet length over a long packet length if:

$$P_{pred} + K\sigma + G\sigma \leq T_1 \quad (1)$$

Equation (1) may be rewritten as follows:

$$\sigma \leq (T_1 - P_{pred})/(K+G) = T_0 \quad (2)$$

From equation (2), the threshold $T_0$ may be computed because $T_1$ and G are fixed parameters, and $P_{pred}$ and K are variables known to the algorithm.

In one embodiment, the threshold computation may be simplified by assigning estimated values for some of the component variables. First, a conservative assumption may be made that K=G=3.0 is based on the knowledge that the backoff control loop is designed to achieve a 1% tail, i.e. a 99% probability that $P_{pred}$ is less than $P_{true}$, and generally K is between 2.0 and 3.0. Next, a fair assumption may be made that the SINR prediction value of the long slot format for the highest supportable data rate is half way between the SINR threshold for that data rate and the SINR threshold for the next highest DRC index. This relationship may be expressed as follows:

$$P_{pred} = (T_2 + T_3)/2 \quad (3)$$

where: $T_2$ equals the SINR threshold for the highest supportable data rate; and $T_3$ equals the SINR threshold for the next highest DRC index. Based on the above assumptions, the condition for favoring the short packet length may be simplified as follows:

$$\sigma \leq T_0 = (1/6)[T_1 - (T_2 + T_3)/2] \quad (4)$$

Of course, it is to be understood that different values may be utilized by the algorithm for the variables in the above equations, and that the values discussed above are by way of example only.

Applying equation (4) to the data rates supporting multiple packet lengths in Table 1, the following thresholds may be used to select the short packet length, where $\sigma_{2s}$, is the standard deviation for the 2-slot prediction error and $\sigma_{4s}$ is the standard deviation for the 4-slot prediction error:

1.228 Mbps
$T_1$=10.3 dB, $T_2$=4.0 dB, and $T_3$=8.0 dB;
$\sigma_{2s} \leq 0.76$ dB
614 kbps
$T_1$=4.0 dB, $T_2$=−0.6 dB, and $T_3$=2.2 dB;
$\sigma_{2s} \leq 0.43$ dB
307 kbps
$T_1$=1.08 dB, $T_2$=−3.5 dB, and $T_3$=−0.6 dB;
$\sigma_{4s} \leq 1.08$ dB Using the methods described above, the subscriber station may determine the relative priority of the short and the long packet lengths for all rates (1.2M, 614k, 307k). The algorithm may be further simplified by combining these three conditions (1.2M, 614k, 307k) into one, i.e., use the most conservative condition among all. In one embodiment, the most conservative condition that ensures the least risk on throughput loss may be conditions used to derive the 614k rate. Using this conservative condition would reduce the complexity of the algorithm while at the same time preserve the potential for ARQ early termination gain by setting a lower preference threshold for short packet lengths. By way of this example, the threshold applicable to Table 1 could be set at 0.43 dB. The tradeoff is that the packing efficiency may be compromised. The threshold may also be conservatively programmed to retain a threshold value of approximately 0.5 dB during data transmission, without being re-calculated and re-set at every slot during transmission.

Using this conservative approach, the adaptive rate prioritizing algorithm can be simplified to:

If $\sigma_{2s} \leq t_0$, the rate request prefers 1.2M-1 slot, 614k-1 slot and 307k-2 slot, else the rate request prefers 1.2M-2 slot, 614k-2 slot and 307k-4 slot.

Of course, the algorithm may be programmed to utilize any threshold value, and can also be dynamically controlled for optimization based upon the available data rates and data format combinations. By setting the threshold at 0 dB, the algorithm mirrors other rate prioritizing methods which always favor the long packet length. Conversely, by setting the threshold at a very high value, the algorithm would always favor the short packet length, maximizing packing efficiency but reducing the potential for ARQ early termination gain.

Figure 5:
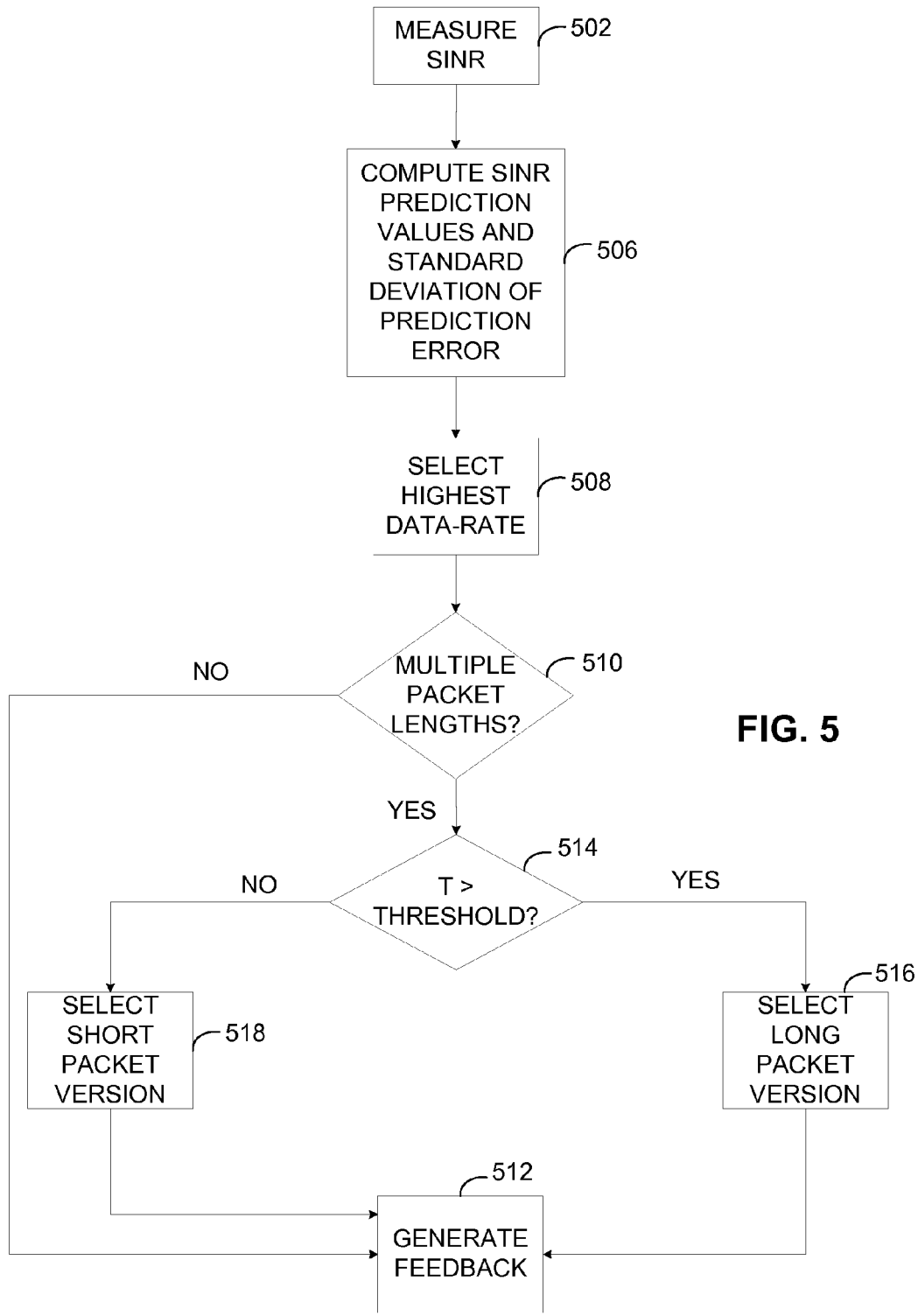
FIG. 5 is a flow diagram illustrating an embodiment of an adaptive rate prioritizing algorithm.

FIG. 5 illustrates a flow diagram of an illustrative adaptive rate prioritizing algorithm. The illustrated adaptive rate prioritizing algorithm performs various functions including the measurement of the forward link transmission quality, the identification of a data rate supporting multiple packet lengths as a function of the measured quality, the selection of one of the packet lengths as a function of a parameter of the measured quality, and the generation of feedback relating to the data rate and the selected packet length. In the embodiments described thus far, the illustrative adaptive rate prioritizing algorithm has been functionally allocated between the SINR estimator 214, the predictor 216 and the DRC generator 218 for the purposes of providing an overview. However, as those skilled in the art will readily appreciate, the adaptive rate prioritizing algorithm may be functionally incorporated into the subscriber station in any manner and may be implemented with one or more dedicated or shared processors. The processor may be a general or special purpose processor or any other equivalent or non-equivalent structure that performs one or more of the functions of the adaptive rate prioritizing algorithm. A general purpose processor may be a microprocessor supporting one or more application programs in an application execution environment, such as an operating system or the like. A special purpose processor may be a digital signal processor, an application specific integrated circuit, a field programmable gate array or other programmable logic device, discrete gate or transistor logic, discrete hardware components, or any combination thereof.

Referring to FIG. 5, the quality of the forward link transmission may be measured in step 502. In step 506, a SINR prediction value may be computed for every packet length and the standard deviation of prediction error may be computed from the SINR measurements and predictions. Next, in step 508, the highest supportable data rate may be selected based on the SINR prediction values. A determination may then be made in step 510 as to whether the highest data rate supports multiple packet lengths for the computed SINR prediction values. If the highest data rate does not support multiple packet lengths, feedback may be generated in step 512 relating to the data rate and the selected packet length. The feedback may be in the form of a DRC index. If, on the other hand, the highest data rate supports multiple packet lengths for the computed SINR prediction values, then a parameter of the quality measurement may be compared against a threshold in step 514. In the embodiments described thus far, the parameter has been the standard deviation of error for the SINR prediction values. In this case, the long slot format may be selected in step 516 if the standard deviation is greater than the threshold. Conversely, if the standard deviation is less than the threshold, then the short slot format may be selected in step 518. Either way, feedback may be generated in step 512 relating to the data rate and the selected packet length.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such the processor can read information from, and write information to, the storage medium. In the alternative, the storage medium may be integral to the processor. The processor and the storage medium may reside in an ASIC. The ASIC may reside in a subscriber station. In the alternative, the processor and the storage medium may reside as discrete components in a subscriber station.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of communications comprising:
   measuring a quality of a transmission from a remote location, the measurement comprising a quality metric;
   identifying a data rate as a function of the measured quality, the identified data rate supporting a plurality of packet lengths;
   computing a quality metric prediction value for each of the packet lengths based on the quality metric measurement;
   selecting one of the packet lengths as a function of a parameter of the measured quality; and
   providing feedback to the remote location, the feedback relating to the data rate and the selected one of the packet lengths.

2. The method of claim 1 wherein the quality metric is measured over time.

3. The method of claim 2 wherein the quality metric comprises a signal-to-interference and noise ratio.

4. The method of claim 1 wherein the parameter comprises a standard deviation of the quality metric measurement.

5. The method of claim 4 wherein the selection of the one of the packet lengths comprises comparing the standard deviation to a threshold.

6. The method of claim 5 wherein the threshold is a function of a probability of gain from an early termination of a subsequent transmission having the selected one of the packet lengths.

7. The method of claim 4 wherein the packet lengths comprise a first packet length and a second packet length longer than the first packet length, and wherein the selection of the one of the packet lengths comprises selecting the first packet length if the standard deviation is below a threshold.

8. The method of claim 4 wherein the packet lengths comprise a first packet length and a second packet length longer than the first packet length, and wherein the selection of the one of the packet length comprises selecting the second packet length if the standard deviation is above a threshold.

9. The method of claim 1 wherein the feedback comprises an index corresponding to the data rate and the selected one of the packet lengths.

10. A communications apparatus, comprising:
    a receiver configured to receive a transmission from a remote location;
    a processor configured to measure a quality of the transmission, the measurement comprising a quality metric, identify a data rate as a function of the measured quality, the identified data rate supporting a plurality of packet lengths, compute a quality metric prediction value for each of the packet lengths based on the quality metric measurement, and select one of the packet lengths as a function of a parameter of the measured quality; and
    a transmitter configured to transmit feedback to the remote location, the feedback relating to the data rate and the selected one of the packet lengths.

11. The communications apparatus of claim 10 wherein the processor is further configured to measure the quality metric over time.

12. The communications apparatus of claim 11 wherein the quality metric comprises a signal-to-interference and noise ratio.

13. The communications apparatus of claim 10 wherein the parameter comprises a standard deviation of the quality metric measurement.

14. The communications apparatus of claim 13 wherein the processor is further configured to select the one of the packet lengths by comparing the standard deviation to a threshold.

15. The communications apparatus of claim 14 wherein the threshold is a function of a probability of gain from an early termination of a subsequent transmission from the remote location having the selected one of the packet lengths.

16. The communications apparatus of claim 13 wherein the packet lengths comprise a first packet length and a second packet length longer than the first packet length, and wherein the processor is further configured to select the first packet length if the standard deviation is below a threshold.

17. The communications apparatus of claim 13 wherein the packet lengths comprise a first packet length and a second packet length longer than the first packet length, and wherein the processor is further configured to select second packet length if the standard deviation is above a threshold.

18. The communications apparatus of claim 10 wherein the feedback comprises an index corresponding to the data rate and the selected one of the packet lengths.

19. A communications apparatus, comprising:
means for measuring a quality of a transmission from a remote location the measurement comprising a quality metric;
means for identifying a data rate as a function of the measured quality, the identified data rate supporting a plurality of packet lengths;
means for computing a quality metric prediction value for each of the packet lengths based on the quality metric measurement;
means for selecting one of the packet lengths as a function of a parameter of the measured quality; and
means for providing feedback to the remote location, the feedback relating to the data rate and the selected one of the packet lengths.

20. A program on a computer readable medium comprising:
code for causing a computer to measure a quality of a transmission from a remote location, the measurement comprising a quality metric;
code for causing a computer to identify a data rate as a function of the measured quality, the identified data rate supporting a plurality of packet lengths;
code for causing a computer to compute a quality metric prediction value for each of the packet lengths based on the quality metric measurement;
code for causing a computer to select one of the packet lengths as a function of a parameter of the measured quality; and
code for causing a computer to provide feedback to the remote location, the feedback relating to the data rate and the selected one of the packet lengths.

* * * * *